United States Patent
Kondo

(10) Patent No.: US 11,252,334 B2
(45) Date of Patent: Feb. 15, 2022

(54) ELECTRONIC DEVICE

(71) Applicant: CANON KABUSHIKI KAISHA, Tokyo (JP)

(72) Inventor: Emi Kondo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/932,248

(22) Filed: Jul. 17, 2020

(65) Prior Publication Data

US 2021/0029299 A1    Jan. 28, 2021

(30) Foreign Application Priority Data

Jul. 24, 2019    (JP) .............................. JP2019-135985

(51) Int. Cl.
*G06F 3/0488* (2013.01)
*H04N 5/232* (2006.01)
*G06F 3/0482* (2013.01)

(52) U.S. Cl.
CPC ..... *H04N 5/232935* (2018.08); *G06F 3/0482* (2013.01); *G06F 3/0488* (2013.01)

(58) Field of Classification Search
CPC ...... G06F 3/0482; G06F 3/041; G06F 3/0488; G06F 3/03545; G06F 3/03547; H04N 5/232935
See application file for complete search history.

(56) References Cited

U.S. PATENT DOCUMENTS

| 8,773,380 B2 | 7/2014 | Li |
| 9,207,860 B2 | 12/2015 | Rydenhag et al. |
| 9,229,634 B2 | 1/2016 | Herz et al. |
| 9,438,789 B2 | 9/2016 | Takagi |
| 10,165,189 B2 | 12/2018 | Sudo |
| 2010/0070915 A1* | 3/2010 | Tsutsui ..................... G09G 5/14 715/800 |

(Continued)

FOREIGN PATENT DOCUMENTS

| JP | 2011-039709 A | 2/2011 |
| JP | 2011-186550 A | 9/2011 |

(Continued)

OTHER PUBLICATIONS

Won-Seok Yang et al., Effects of Visual Elements into the Touch Interaction During the Drag Operation, Aug. 1, 2014, IEEE Xplore, pp. 141-146 (Year: 2014).*

(Continued)

*Primary Examiner* — Tam T Tran

(74) *Attorney, Agent, or Firm* — Cowan, Liebowitz & Latman, P.C.

(57) ABSTRACT

An electronic device according to the present invention controls so that in a case where a first screen is displayed, a first function is executed in response to a first type of operation in which touch is performed again at one location within a first time from touch at one location, and in a case where a second screen is displayed, a second function is executed in response to a second type of operation in which touch is performed at one location, without waiting for the first time to elapse, and a third function is executed in response to a third type of operation in which touch is performed again at two locations within a predetermined time from touch at two locations.

22 Claims, 9 Drawing Sheets

(56) References Cited

U.S. PATENT DOCUMENTS

| | | | |
|---|---|---|---|
| 2010/0309147 A1 | 12/2010 | Fleizach et al. | |
| 2011/0014983 A1 | 1/2011 | Miller, IV | |
| 2015/0074615 A1* | 3/2015 | Han | H04W 12/06 715/863 |
| 2017/0052631 A1* | 2/2017 | Perng | G06F 3/0416 |
| 2019/0187871 A1* | 6/2019 | Ueguri | G06F 3/0412 |
| 2021/0162115 A1* | 6/2021 | Surine | A61M 5/1456 |

FOREIGN PATENT DOCUMENTS

| | | |
|---|---|---|
| JP | 5620947 B2 | 11/2014 |
| RU | 2519481 C2 | 6/2014 |
| RU | 2017145910 A | 6/2019 |
| WO | 2014/205605 A1 | 12/2014 |

OTHER PUBLICATIONS

Kexu Ma et al., Enhancing Touchscreen Input via Finger Identification, Mar. 1, 2016, IEEE Xplore, pp. 1-3 (Year: 2016).*

The above patent document was cited in a British Office Action dated Feb. 18, 2021, which is enclosed, that issued in the corresponding U.K. Patent Application No. 2010961.7.

The above patent documents were cited in a May 24, 2021 Russian Allowance, which is enclosed with an English Translation, that issued in Russian Patent Application No. 2020124397.

* cited by examiner

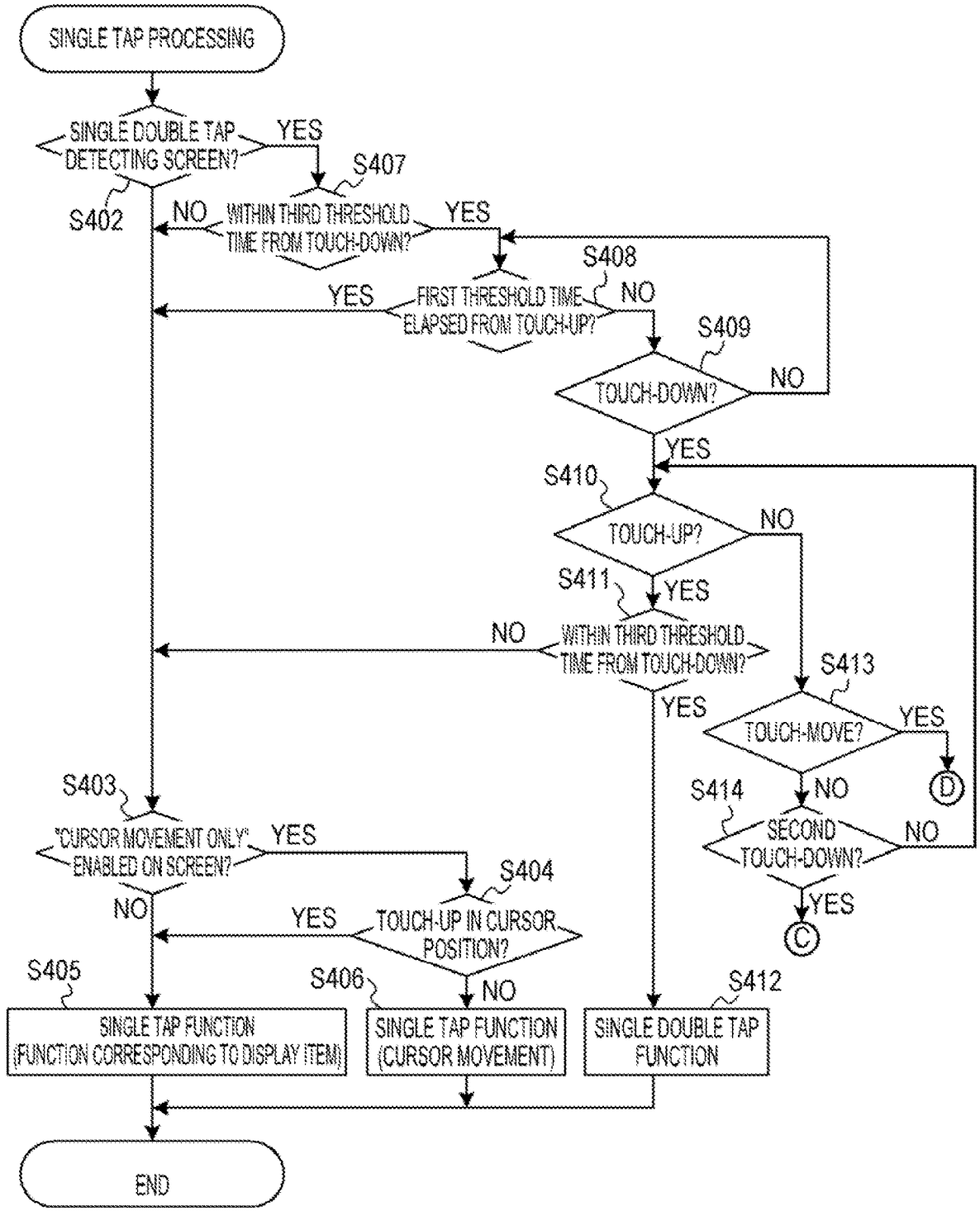

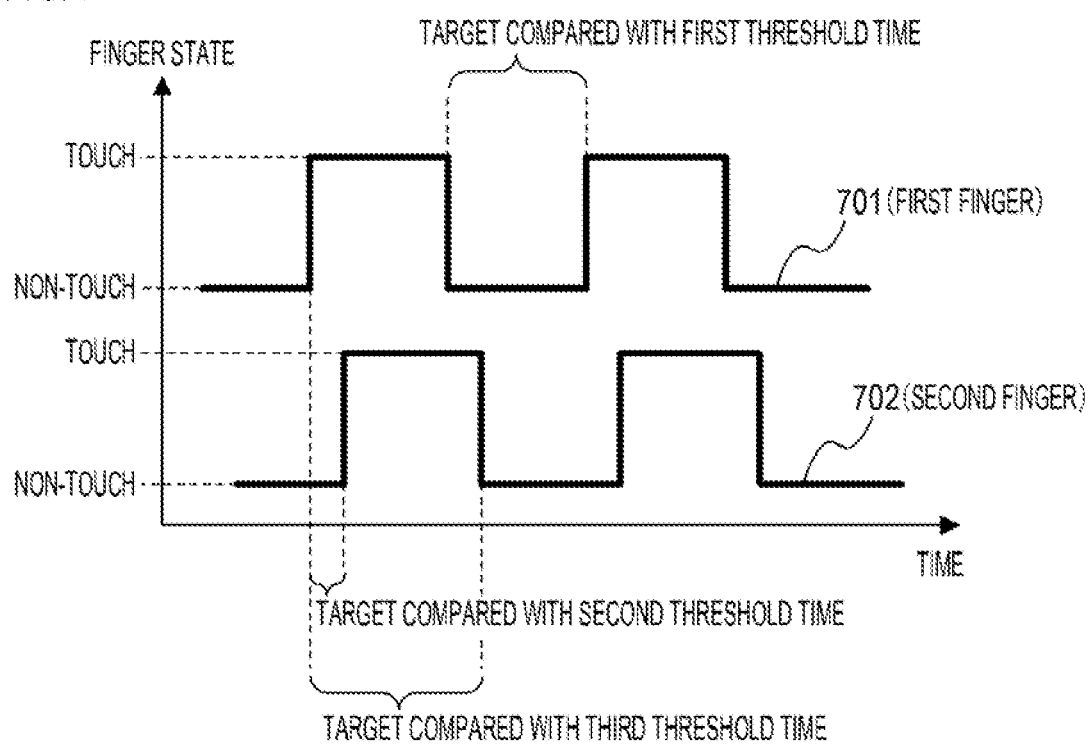

ELECTRONIC DEVICE

BACKGROUND OF THE INVENTION

Field of the Invention

The present invention relates to an electronic device and a method for controlling the same, and more specifically to an electronic device capable of detecting touch operation.

Description of the Related Art

A double tap carried out for example with a single finger or a touch pen (hereinafter as a "single double tap") is used to enlarge a screen or an image displayed. Japanese Patent Application Publication No. 2011-39709 suggests that an image is enlarged by a single tap, and switching between single playback and multiple playback is carried out by a single double-tap. Meanwhile, a double tap carried out with two or more fingers or a touch pen is known (hereinafter simply as "multi-double tap"). Japanese Patent Application Publication No. 2011-186550 suggests that the canvas is enlarged in response to a multi-double tap.

However, in a single double tap, a single tap is followed by another single tap. Therefore, according to the disclosure of Japanese Patent Application Publication No. 2011-39709, a standby time is provided for execution of the function of a single tap after a single tap in order to determine whether a single double tap is carried out (or whether another single tap is carried out within a predetermined time). If the standby time is long, the response to the single tap is slowed, and for example photo opportunities may be missed. Meanwhile, if the standby time is short, the recognition ratio (detection ratio) for a single double tap may be lowered. For example, a single double tap is more likely to be detected as two single taps (or the function of the single tap is more likely to be carried out twice instead of the function of the single double tap).

SUMMARY OF THE INVENTION

In view of the foregoing, the present invention provides an electronic device which provides operational feeling resulting from high response which allows a function corresponding to a single tap to be carried out quickly and convenience which allows many functions to be used separately in response to touch operation.

An electronic device according to the present invention, includes: a touch detector configured to detect a touch operation on an operation surface; and at least one memory and at least one processor which function as: a control unit configured to control so that in a case where a first screen is displayed on a display, a first function is executed in response to a first type of operation in which the operation surface is touched at one location and the operation surface is touched again at one location within a first time from the touch at the previous location, and in a case where a second screen is displayed on the display, a second function is executed in response to a second type of operation in which the operation surface is touched at one location, without waiting for the first time to elapse from the touch at the location, and a third function is executed in response to a third type of operation in which the operation surface is touched at two locations and the operation surface is touched again at two locations within a predetermined time from the touch at the previous two locations.

Further features of the present invention will become apparent from the following description of exemplary embodiments with reference to the attached drawings.

BRIEF DESCRIPTION OF THE DRAWINGS

FIG. 4 is a flowchart for single touch processing;
FIG. 7 is a timing chart for illustrating comparison targets with first to third threshold times.

DESCRIPTION OF THE EMBODIMENTS

Figure 1A:
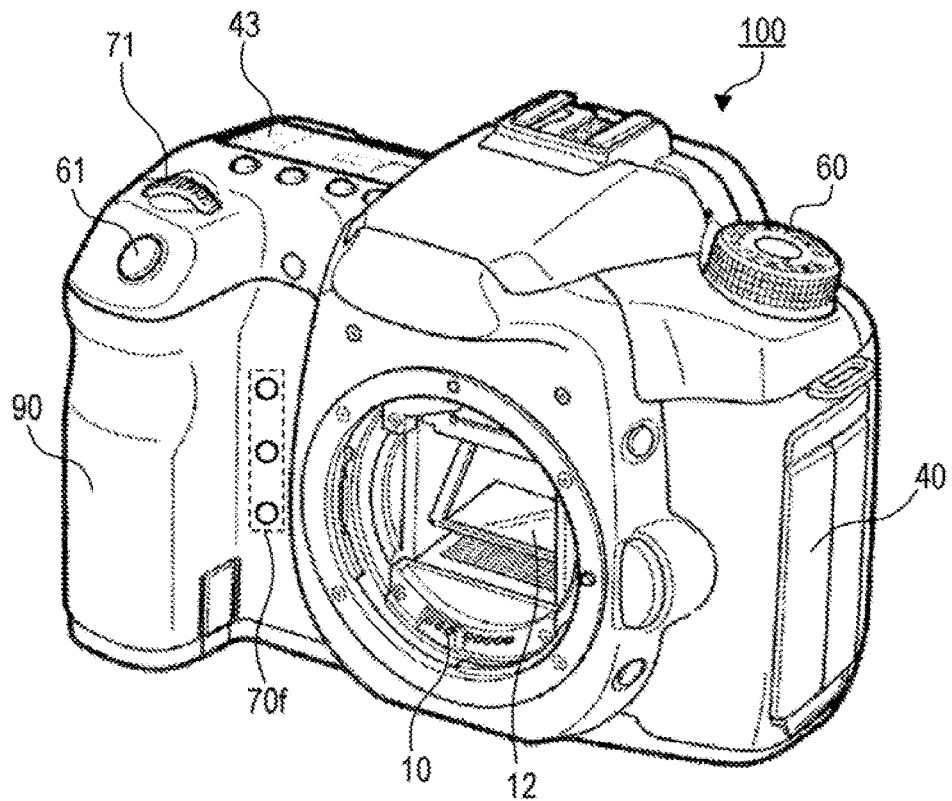
FIGS. 1A and 1B show the outer appearance of a digital camera 100.
Figure 1B:
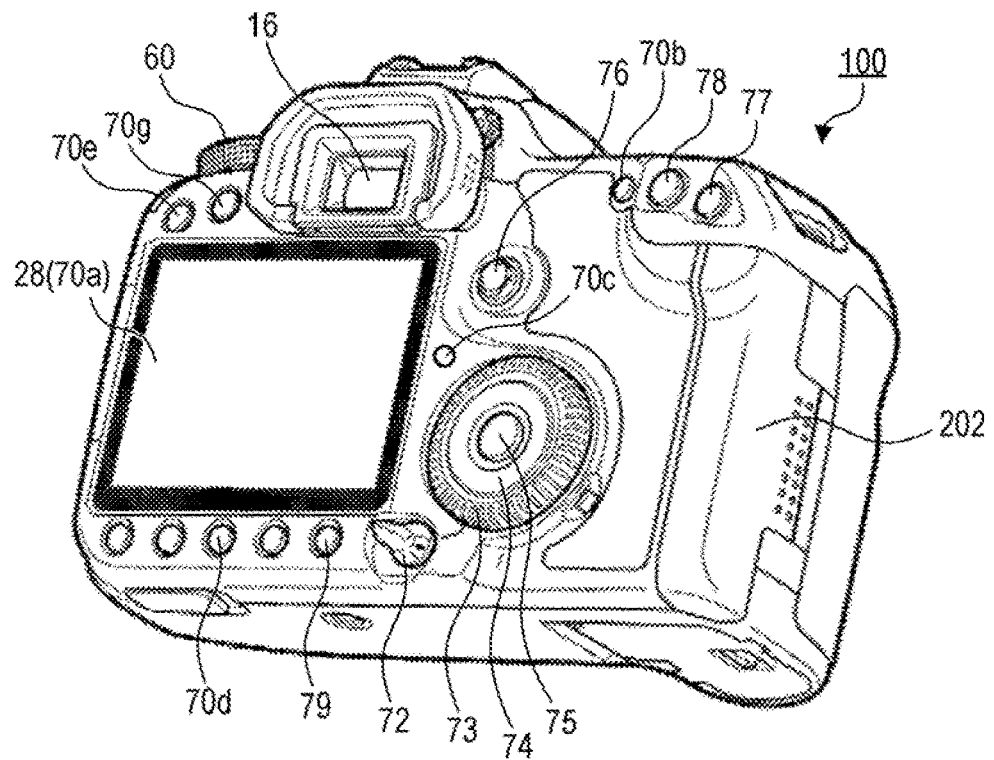

Hereinafter, a preferred embodiment of the present invention will be described with reference to the accompanying drawings. FIGS. 1A and 1B show the outer appearance of a digital camera 100 as an example device to which the present invention can be applied. FIG. 1A is a front perspective view of the digital camera 100, and FIG. 1B is a rear perspective view of the digital camera 100.

A display unit 28 is provided at the back of the digital camera 100 to display images and various types of information. A touch panel 70a can detect touch operation on the display surface (touch operation surface) of the display unit 28. An out-finder indicator 43 is provided on the upper surface of the digital camera 100 to indicate various setting values for the digital camera 100, such as a shutter speed and an aperture. A shutter button 61 is an operation member used to give an imaging instruction. A mode selecting switch 60 is an operation member used to switch among various modes. A terminal cover 40 is used to protect a connector (not shown) for example with a connection cable which connects the digital camera 100 to an external device.

A main electronic dial 71 is a rotating operation member, and setting values such as a shutter speed and an aperture can be changed by turning the main electronic dial 71. A power source switch 72 is an operation member used to switch between the on and off states of the power source of the digital camera 100. A sub-electronic dial 73 is a rotating operation member, and a selection frame (cursor) can be moved or an image can be fed by turning the sub-electronic dial 73. A four-way key 74 has upper, lower, left, and right parts which can be pressed, and processing corresponding to a pressed part of the four-way key 74 can be performed. Although the four-way key 74 is an integral operation member in the description of the embodiment, the upper, lower right, and left buttons may be independent directional buttons. A SET button 75 is a push button and mainly used to determine a selecting item.

An LV button 76 switches between the on and off states of a live view (LV) in a still image imaging mode. In a moving image imaging mode, the LV button 76 is used to instruct the start or stop of moving image imaging (recording). An enlargement button 77 is an operation button used to switch between the on and off states of the enlargement mode and change the magnification ratio during the enlargement mode in the live view display in the imaging mode. In a playback mode, the enlargement button 77 serves as an enlargement button used to enlarge a playback image or increase the magnification of thereof. A reduction button 78 is used to reduce the magnification of an enlarged playback image and to reduce a displayed image. A playback button 79 is an operation button used to switch between the imaging mode and the playback mode. When the playback button 79 is pressed in the imaging mode, the mode is changed to the playback mode, and the latest image among images recorded in a recording medium 200 (which will be described) can be displayed at the display unit 28.

An AF-ON button 70b is a push button and can be pressed to instruct execution of AF (auto focusing). The pushing direction of the AF-ON button 70b is parallel to the direction (optical axis) of the object light which enters the imaging unit 22 (which will be described later) from a lens 103 (which will be described). A menu button 70e is a push button and can be pressed to display a menu screen at the display unit 28 which enables various settings. The user can perform various settings by intuition using the menu screen displayed at the display unit 28 and the four-way key 74 or the SET button 75. There are also a Q button 70c, an active frame switching button 70d, function buttons 70f, and an info-button 70g.

A quick return mirror 12 is instructed by a system control unit 50 (which will be described) and is turned up and down by an actuator (not shown). A communication terminal 10 is used for communication between the digital camera 100 and a lens unit 150 (which is removable and will be described). An eyepiece finder 16 (hereinafter referred to as the finder 16) is a finder for checking the focus and composition of an optical image of an object obtained through the lens unit 150 by observing a focusing screen 13 (which will be described). A lid 202 is a lid for a slot for storing the recording medium 200. A grip part 90 is a holder in a shape which allows the right hand to easily grasp the grip part when the user gets the digital camera 100 ready for imaging.

Figure 2:
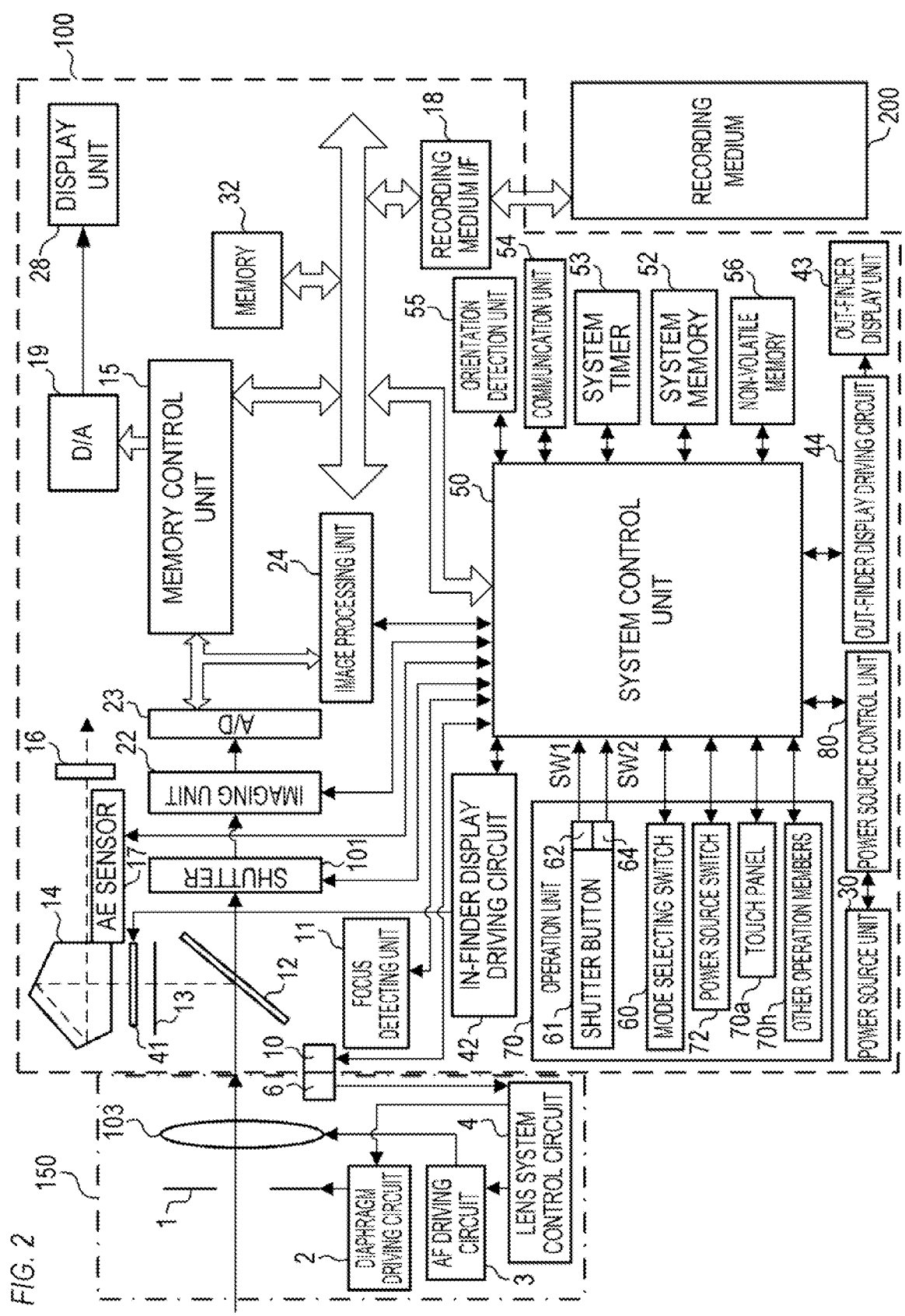
FIG. 2 is a block diagram of the digital camera 100.

FIG. 2 is a block diagram of an example structure of the digital camera 100.

The lens unit 150 is equipped with an interchangeable photographic lens. A lens 103 typically includes a plurality of lenses but only one lens is illustrated in FIG. 2 for the sake of simplification. A communication terminal 6 is used by the lens unit 150 to communicate with the side of the digital camera 100, and a communication terminal 10 is used by the digital camera 100 to communicate with the side of the lens unit 150. The lens unit 150 communicates with the system control unit 50 through the communication terminals 6 and 10. The lens unit 150 controls a diaphragm 1 through a diaphragm driving circuit 2 by a lens system control circuit 4 therein. The lens unit 150 also focuses by displacing the position of the lens 103 through an AF driving circuit 3 by the lens system control circuit 4.

An automatic exposure (AE) sensor 17 measures the brightness of an object (object light) passed through the lens unit 150.

A focus detecting unit 11 outputs defocus amount information to the system control unit 50. The system control unit 50 controls the lens unit 150 on the basis of the defocus amount information and performs phase difference auto focusing (AF). The AF may be contrast AF or imaging plane phase difference AF instead of the phase difference AF.

The quick return mirror 12 (hereinafter referred to as the mirror 12) is instructed by the system control unit 50 for example during exposure, live view imaging, moving image imaging, and turned up and down by an actuator (not shown). The mirror 12 is used to switch the beam of light incident from the lens 103 between the side of the finder 16 and the side of the imaging unit 22. The mirror 12 is normally arranged to guide (reflect) a beam of light toward the finder 16 (the mirror is turned down), but when imaging or live view display is performed, the mirror 12 is raised upward to guide a beam of light toward the imaging unit 22 to avoid the beam (the mirror is turned up). In addition, the mirror 12 is a half mirror so that a part of the light is transmitted through the center part thereof and transmits a part of the light beam so that the beam enters the focus detecting unit 11 for focus detection.

The user can check the focus and composition of an optical image of an object obtained through the lens unit 150 by observing the focusing screen 13 through a pentaprism 14 and the finder 16.

A shutter 101 is a focal plane shutter which can freely control exposure time for the imaging unit 22 under the control of the system control unit 50.

The imaging unit 22 is an imaging device inducing a CCD or a CMOS device which converts an optical image into an electrical signal. The imaging unit 22 may include an imaging plane phase difference sensor which outputs defocus amount information to the system control unit 50. An A/D converter 23 converts an analog signal output from the imaging unit 22 into a digital signal.

An image processing unit 24 performs predetermined processing (for example resizing processing such as pixel interpolation and reduction and color conversion processing) to data from the A/D converter 23 or data from a memory control unit 15. The image processing unit 24 performs predetermined arithmetic processing using captured image data, and the system control unit 50 performs exposure control or ranging control on the basis of the calculation result obtained by the image processing unit 24. In this way, for example, through the lens (TTL) based auto focusing (AF) processing, automatic exposure (AE) processing, and EF (pre-flash) processing are performed. The image processing unit 24 further performs predetermined arithmetic processing using the captured image data and TTL based auto-white balance (AWB) processing on the basis of the obtained calculation result.

The output data from the A/D converter 23 is written in a memory 32 through the image processing unit 24 and the memory control unit 15. Alternatively, the output data from the A/D converter 23 is written in the memory 32 through the memory control unit 15 but not through the image processing unit 24. The memory 32 stores image data obtained by the imaging unit 22 and converted into digital data as a result of conversion by the A/D converter 23 and image data to be displayed at the display unit 28. The memory 32 has a sufficient storage capacity for storing a predetermined number of still images and moving images and sounds for a predetermined time.

The memory 32 also serves as a memory for image display (video memory). A D/A converter 19 converts data for image display stored in the memory 32 into an analog signal and provides the signal to the display unit 28. In this way, the image data for display written in the memory 32 is displayed at the display unit 28 through the D/A converter 19. The display unit 28 carries out display corresponding to the analog signal from the D/A converter 19 on a display such as an LCD or an organic EL. A digital signal converted by the A/D converter 23 and stored in the memory 32 is converted into an analog signal at the D/A converter 19, and then the signal is sequentially transmitted to be displayed at the display unit 28, so that live view display (LV) can be performed. Hereinafter, the image displayed in live view display will be referred to as the live view image (LV image).

A frame (AF frame) indicating a ranging point at which auto focusing is currently in progress or icons indicating the set conditions of the camera are displayed on an in-finder display 41 through an in-finder display driving circuit 42.

Various setting values for the camera, such as a shutter speed and an aperture, are displayed on an out-finder display 43 through an out-finder display driving circuit 44.

A non-volatile memory 56 is an electrically erasable and recordable memory, such as EEPROM. The non-volatile memory 56 records for example a constant for the operation of the system control unit 50, and programs. Here, the programs are programs for executing various flowcharts which will be described in the following description of the embodiment.

The system control unit 50 includes at least one processor or circuit which controls the entire digital camera 100. The system control unit 50 executes a program recorded in the non-volatile memory 56 to realize each processing according to the embodiment which will be described later. The system memory 52 is for example a RAM, and the system control unit 50 deploys, in the system memory 52, a constant and a variable for the operation of the system control unit 50 and a program read out from the non-volatile memory 56. The system control unit 50 also controls for example the memory 32, the D/A converter 19, and the display unit 28 to perform display control.

A system timer 53 is a clock unit which measures time used for various types of control and the time of a built-in clock.

A power source control unit 80 includes for example a battery detecting circuit, a DC-DC converter, and a switch circuit for selecting a block to be supplied with power, the power source control unit detects whether a battery is inserted, the type of the battery, and the remaining battery capacity. The power source control unit 80 also controls the DC-DC converter on the basis of the detection result and an instruction from the system control unit 50 to supply necessary voltage to various components including the recording medium 200 for necessary time periods. A power source unit 30 includes a primary battery such as an alkaline battery and a lithium battery, a secondary battery such as a NiCd battery, a NiMH battery, and a Li battery, and an AC adaptor.

A recording medium interface I/F 18 is an interface with the recording medium 200 such as a memory card and a hard disk. The recording medium 200 is for example a memory card for recording captured images and includes for example a semiconductor memory and a magnetic disk.

A communication unit 54 transmits/receives a video signal and an audio signal to/from an external device connected therewith wirelessly or by a wire cable. The communication unit 54 can also be connected with a wireless local area network (LAN) and the Internet. The communication unit 54 can also communicate with an external device by Bluetooth® or Bluetooth® Low Energy. The communication unit 54 can transmit images (including an LV image) captured by the imaging unit 22 and images recorded in the recording medium 200, and receive image data and other various types of information from an external device.

An orientation detecting unit 55 detects the orientation of the digital camera 100 with respect to the gravity direction. The system control unit 50 can determine whether the image captured by the imaging unit 22 is an image captured by the digital camera 100 horizontally held or vertically held digital on the basis of the orientation detected by the orientation detecting unit 55. The system control unit 50 can add direction information corresponding to the orientation detected by the orientation detecting unit 55 to the image file of the image captured by the imaging unit 22 or rotate the image before recording. An acceleration sensor or a gyro-sensor can be used as the orientation detecting unit 55. Using the acceleration sensor or the gyro-sensor as the orientation detecting unit 55, the movement of the digital camera 100 (for example, whether the camera is panning, tilted, lifted, or stationary) can be detected.

An operation unit 70 is an input unit which receives operation (user operation) from a user and is used to input various operation instructions to the system control unit 50. As shown in FIG. 2, the operation unit 70 includes for example the mode selecting switch 60, the shutter button 61, the power source switch 72, and the touch panel 70a. The operation unit 70 includes, as other operation members 70h, the main electronic dial 71, the sub-electronic dial 73, the four-way key 74, the SET button 75, the LV button 76, the enlargement button 77, the reduction button 78, and the playback button 79. The operation unit 70 includes, as other operation members 70h, the AF-ON button 70b, the Q button 70c, the active frame switching button 70d, the menu button 70e, the function buttons 70f, and the info-button 70g. The operation members of the operation unit 70 are each suitably assigned a function for each scene and serves as a function button as various function icons displayed at the display unit 28 are selectively operated. Examples of the function buttons include an end button, a return button, an image-forwarding button, a jump button, a narrowing-down button, and an attribute-changing button.

The mode selecting switch 60 switches the operation mode of the system control unit 50 between the still image imaging mode, the moving image imaging mode, and the playback mode. The still image recording mode includes an auto imaging mode, an auto scene determining mode, a manual mode, a diaphragm priority mode (Av mode), a shutter speed priority mode (Tv mode), and a program AE mode (P mode). There are various scene modes and a custom mode set on an imaging scene basis. The mode selecting switch 60 allows the user to directly switch the mode among these modes. Alternatively, the user may select the imaging mode list screen using the mode selecting switch 60 and then select one of a plurality of displayed modes using any of the other operation members. Similarly, the moving image imaging mode may also include a plurality of modes.

The shutter button 61 includes a first shutter switch 62 and a second shutter switch 64. The first shutter switch 62 turns on in the process of operation or during half-pressing of the shutter button 61 (imaging preparation instruction) and generates a first shutter switch signal SW1. In response to the first shutter switch signal SW1, the system control unit 50 starts operation for imaging preparation such as auto focusing (AF) processing, auto exposure (AE) processing, auto white balance (AWB) processing, and EF (pre-flash) processing. The second shutter switch 64 turns on in response to completion of operation or full-pressing of the shutter button 61 (imaging instruction) and generates a second shutter switch signal SW2. In response to the second shutter switch signal SW2, the system control unit 50 starts a series of steps of imaging processing operation after signals are read out from the imaging unit 22 until captured image data is written in the form of an image file in the recording medium 200.

The touch panel 70a and the display unit 28 can be integrally formed. For example, the touch panel 70a is configured so that the transmittance of light does not disturb the display at the display unit 28, and is attached to the upper layer of the display surface of the display unit 28. Then, input coordinates on the touch panel 70a are associated with display coordinates at the display unit 28. In this way, such a graphical user interface (GUI) that allows the user to feel as if directly operating the screen displayed at the display unit 28 is provided. The system control unit 50 can detect the following steps of operation on the touch panel 70a or the states thereof.

A finger or pen which has not touched the touch panel 70a newly touches the touch panel 70a or the start of a touch (hereinafter referred to as a "touch-down").

The finger or pen touches the touch panel 70a (hereinafter referred to as a "touch-on").

The finger or pen moves while still touching the touch panel 70a (hereinafter referred to as a "touch-move").

The finger or pen in touch with the touch panel 70a moves away (is released) from the touch panel 70a or the end of the touch (hereinafter referred to as a "touch-up").

Nothing touches the touch panel 70a (hereinafter referred to as a "touch-off").

When a touch-down is detected, a touch-on is detected at the same time. After a touch-down is detected, a touch-on normally continues to be detected until a touch-up is detected. When a touch-move is detected, a touch-on is detected at the same time. Even when a touch-on is detected, and the touch position is not moving, a touch-move is not detected. After a touch-up is detected for all of fingers or pen in touch with the touch panel, a touch-off is detected.

The above-described steps of operation and states as well as the coordinates of the position in which the finger or pen touches on the touch panel 70a are notified to the system control unit 50 through an internal bus. The system control unit 50 determines what type of operation (touch operation) has been performed on the touch panel 70a on the basis of the notified information. As for a touch-move, the moving direction of the finger or pen moving on the touch panel 70a can be determined for each of the vertical and horizontal components on the touch panel 70a on the basis of changes of the position coordinates. When a touch-move over a predetermined distance or longer is detected, the system control unit 50 determines that sliding operation has been performed. Operation to quickly move the finger in contact with the touch panel 70a over a certain distance and then release the finger is referred to as a flick. In other words, a flick is operation by the finger quickly touching and moving, like quick swiping motion, on the touch panel 70a. When a touch-move at a predetermined speed or higher over a predetermined distance or longer is detected and then a touch-up is detected, it can be determined that a flick has been performed (sliding operation followed by a flick is determined). Touch operation to simultaneously touch multiple positions (for example, two positions) and bring these touching positions close to each other is referred to as a "pinch-in." Touch operation to move these touching positions apart from each other is referred to as a "pinch-out." A pinch-out and a pinch-in are collectively referred to as pinch operation (or simply referred to as a "pinch"). The touch panel 70a may be any of various types of panels including a resistance film type, a capacitance type, a surface acoustic wave type, an infrared-ray type, an electromagnetic induction type, an image recognition type, and an optical sensor type. A touch is detected when the finger or pen comes in contact with the touch panel or when the finger or pen comes close to the touch panel depending on the type, and either of the types can be used.

Figure 3:
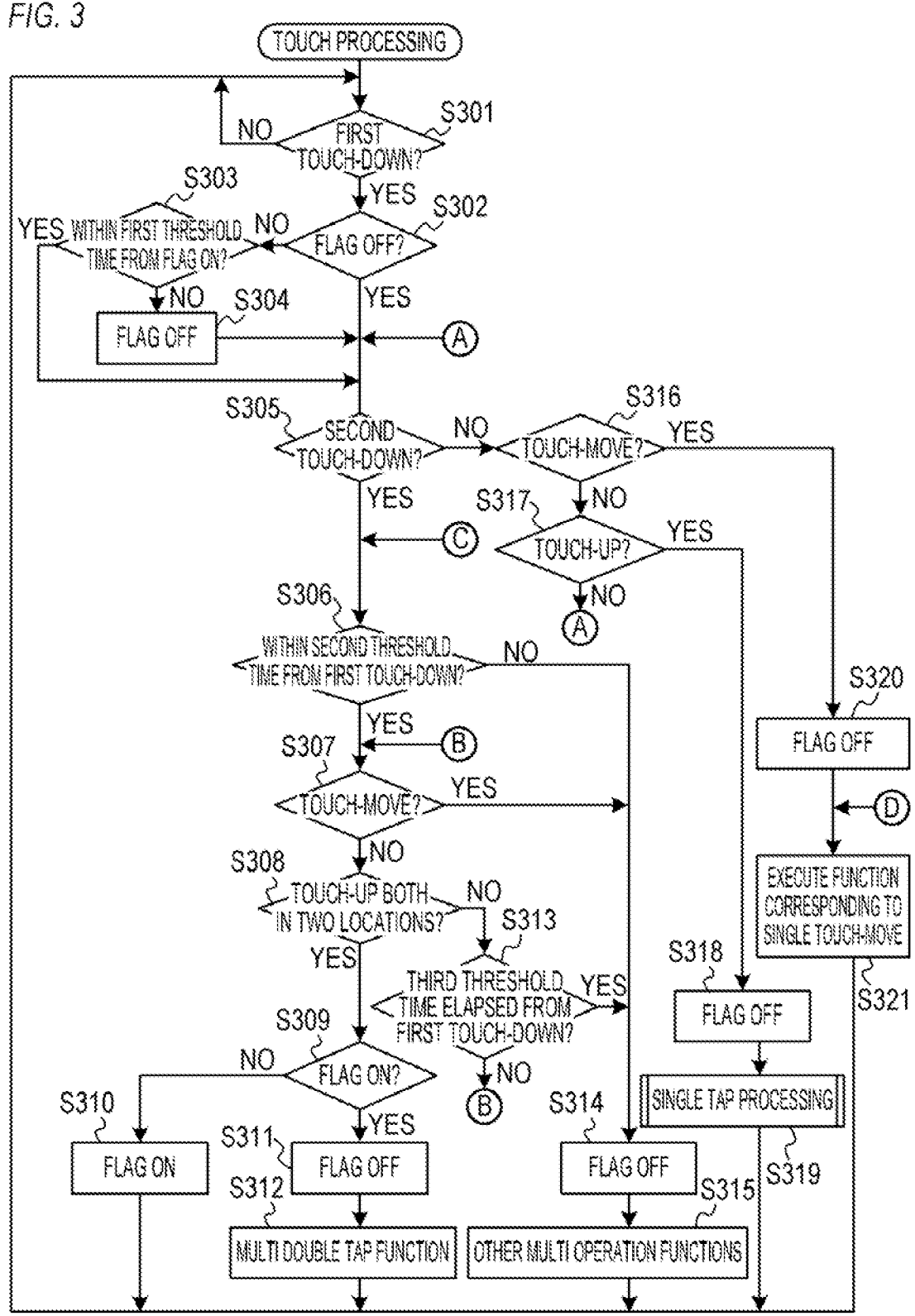
FIG. 3 is a flowchart for illustrating touch processing.

FIG. 3 is a flowchart for illustrating in detail touch processing carried out by the digital camera 100. The processing is implemented when the system control unit 50 deploys a program recorded in the non-volatile memory 56 in the system memory 52 and then executes the program. When the digital camera 100 is turned on, the processing illustrated in FIG. 3 starts. Note that according to the embodiment, at least four types of operation as follows can be detected as touch operation on the touch panel 70a (the display unit 28).

Single tap: operation including a touch (single touch) carried out on the touch panel 70a in one location (one point), and release of the touch without a touch-move.

Single double tap: a series of steps of operation including a touch (a single touch) carried out on the touch panel 70a in one location (one point), subsequent release of the touch without a touch-move, another touch (single touch) carried out in one location (one point) within a predetermined time (within a first threshold time) after the release of the previous touch, and subsequent release of the touch in the location without a touch-move.

Multi-tap: operation including a touch on the touch panel 70a carried out in two locations (two points) and release of the touch in the two locations (two points) without a touch-move.

Multi-double tap: A series of steps of operation including a touch (multi-touch) carried out on the touch panel 70a in two locations (two points), subsequent release of the touch in the two locations (two points) without a touch-move, another touch (multi-touch) carried out in two locations (two points) within a predetermined time (the first threshold time) after the release of the previous touch in the two locations (two points), and subsequent release of the touch in the two locations without a touch-move.

In S301, the system control unit 50 determines whether there has been a touch-down on the touch panel 70a in the first location (first point). The step S301 is repeated until there is a first touch-down, second and third threshold times (which will be described) start to be measured upon determining a touch-down in a first location, and the process proceeds to S302.

In S302, the system control unit 50 determines whether a multi-tap flag recorded in the system memory 52 is off (indicating that a multi-tap is not carried out). The process proceeds to S305 if the flag is off and to S303 if not.

In S303, the system control unit 50 determines whether time elapsed after the turning ON of the multi-tap flag (execution of a multi-tap) is within the first threshold time. The state in which the multi-tap flag is on indicates that the elapsed time is not more than the first threshold time from release of a tap (multi-tap) immediately previously carried out by a multi-touch. When the multi-tap flag is ON and another multi-tap is carried out, it is determined that a multiple double tap has been carried out. If the time is within the first threshold time, the process proceeds to S305 and to S304 if not. The first threshold time will be described with reference to FIG. 7.

In S304, the system control unit 50 updates the multi-tap flag recorded in the system memory 52 to OFF so that the multi-tap flag is set to OFF.

In S305, the system control unit 50 determines whether there has been a second touch-down on the touch panel 70a. If a touch by a touch-down detected in a first location in S301 is not released and a touch-down is detected in another location, the result of determination is Yes and the process proceeds to S306. The process proceeds to S306 when a multi-touch is detected. If there is no touch-down in a second location (if the single touch state continues), the process proceeds to S316.

In S306, the system control unit 50 determines whether detection of a touch-down in a second location in S305 is within the second threshold time from the first touch-down detected in S301. If the time elapsed is within the second threshold time, it is determined that the two touches have been carried out almost simultaneously (the user touched two locations simultaneously) and the process proceeds to S307. If not, the process proceeds to S314.

In S307, the system control unit 50 determines whether there has been a touch-move. If it is determined that there has been a touch-move, the process proceeds to S314, and if not, the process proceeds to S308.

In S308, the system control unit 50 determines whether there have been two touch-ups, in other words whether both a touch in a first location (S301) and a touch in a second location (S306) have been moved away from the touch panel 70*a* as touch-ups. If it is determined that there have been two touch-ups, the process proceeds to S309, and to S314 if not. The processing is performed in S313 (which will be described) before the elapse of the third threshold time from the first touch-down (S301) (in other words, the processing performed when it is determined that the third threshold time has not elapsed). More specifically, the result of determination in S308 is Yes if both the first touch (S301) and the second touch (S306) are moved up from the touch panel 70*a* within the third threshold time from the first touch-down (S301). If it is determined that there has been a touch-up in S308, the system control unit 50 starts to measure the first threshold time.

In S309, the system control unit 50 determines whether the multi-tap flag is ON. If the flag is ON (by determining that there has been a multiple double tap), the process proceeds to S311. Otherwise, the process proceeds to S310 (by determining that there has been a multi-tap).

In S310, the system control unit 50 starts to measure the first threshold time and updates the multi-tap flag recorded in the system memory 52 to ON so that the multi-tap flag is set to ON. The first threshold time may start to be measured when it is determined that there has been a touch-up in S308, and the measurement of the first threshold time may not be started in S310.

In S311, the system control unit 50 updates the multi-tap flag recorded in the system memory 52 to OFF so that the multi-tap flag is set to OFF.

In S312, the system control unit 50 performs a function (processing) corresponding to the multiple double tap. An example of the function corresponding to a multiple double tap (function assigned to a multi-double tap) is enlarged display of a part of a displayed screen. While any of other functions may be assigned, according to the embodiment, the function corresponding to the multiple double tap is a function which is not based on a display item touched by the multi-double tap. In a multi-double tap, a touch on the display screen is carried out in two locations and the touch is repeated twice consecutively, and therefore a total of four touch-down locations are generated. When functions corresponding to the touched display items are assigned to the multi-double tap makes it difficult for the user to know which function among those corresponding to the display items is to be performed among these four locations. Therefore, the functions associated with the touched display items are not assigned to the multi-double tap. For example, any of the following functions may be assigned to a multiple double tap as a function corresponding to the multi-double tap and not based on the displayed items touched by the multiple double tap. Functions to return to the previous screen, turn off the display, change the display brightness, switch the information to be displayed, change the setting of a specific setting item, call up the setting menu screen, switch to a specific screen (for example the home screen), and change to the state for inputting the search key. The functions each corresponding to a multiple double tap will be described for example with reference to FIGS. 6A to 6C.

In S313, the system control unit 50 determines whether the third threshold time has elapsed after the first touch-down (after the result of determination is Yes in S301). If the third threshold time has elapsed, the process proceeds to S314, and if not, the process returns to S307 and repeats the processing.

In S314, the system control unit 50 updates the multi-tap flag recorded in the system memory 52 to OFF so that the multi-tap flag is set to OFF. In S315, the system control unit 50 determines multi-operation other than a multi-tap or a multi-double tap, and performs a function (processing) according to the determination result. Multi-operation other than a multi-tap or multi-double tap is, for example, a pinch-in or pinch-out.

In S316, the system control unit 50 determines whether there has been a touch-move by a single touch. The process proceeds to S320 if there has been a touch-move, and to S317 if not.

In S317, the system control unit 50 determines whether there has been a touch-up. If there has been a touch-up (when there is no touch-move in S316, and a touch-up is carried out without a touch-move by a single touch), the process proceeds to S318, and otherwise return to S305 and repeats the processing. If it is determined in S317 that there has been a touch-up, the system control unit 50 starts to measure the first threshold time.

In S318, the system control unit 50 updates the multi-tap flag recorded in the system memory 52 to OFF so that the multi-tap flag is set to OFF. In S319, the system control unit 50 performs single tap processing for performing a function (processing) corresponding to a single tap or a single double tap. The single tap processing will be described with reference to FIG. 4.

In S320, the system control unit 50 updates the multi-tap flag recorded in the system memory 52 to OFF so that the multi-tap flag is set to OFF. In S321, the system control unit 50 performs a function (processing) corresponding to a touch-move (slide operation) by a single touch. For example, if a playback image is in the process of being displayed, the image to be displayed is switched to the next or previous image in response to the left or right touch-move.

FIG. 4 is a flowchart for illustrating in detail single tap processing (S319 in FIG. 3) performed by the digital camera 100. This processing is implemented as the system control unit 50 deploys a program recorded in the non-volatile memory 56 in the system memory 52 and executes the program.

In S402, the system control unit 50 determines whether the screen displayed at the display unit 28 is a screen for sensing a single double tap (a screen in which a single double tap is enabled or a screen in which a function assigned to a single double tap is present). The process proceeds to S407 if the screen is for single-double tap detection and to S403 if not (upon determining the presence of a single tap). Here, if it is determined that the screen is not a screen for sensing a single double tap, the function assigned to the single tap is performed without standing by for the first threshold time to elapse in S408 which will be described. Therefore, the time from the touch-up in S317 to execution of the function corresponding to the single double tap is shorter and the response is better than the screen for sensing a single double tap. The screen for sensing/not sensing a single double tap will be described with reference to FIGS. 5A to 5C.

In S403, the system control unit 50 determines whether the screen displayed at the display unit 28 is a screen which may have "cursor movement only." In the screen which may have "cursor movement only," the cursor can be moved without performing a function corresponding to a displayed item in the position in which a single tap has been detected (to which the cursor has been moved) in response to the single tap. The cursor is an indicator which indicates that a displayed item is selected (such as a display item or a selection frame identified for example in different colors). The process proceeds to S404 for a screen which allows the "cursor movement only" to be performed by a single tap, and to S405 if not. The screen which allows the "cursor movement only" to be performed by a single tap will be described with reference to FIGS. 8A to 8D.

In S404, the system control unit 50 determines whether the single tap performed was a single tap for a selected item (a display item selected by the cursor). For a single tap for a selected item (if there is an instruction to perform a function assigned to the selected display item), the process proceeds to S405, and if not, the process proceeds to S406.

In S405, the system control unit 50 performs the function (processing) corresponding to the single tapped display item. A function corresponding to a single tapped displayed item (operated item) is a function assigned to the operated item and is different for each display item. In addition, the function (processing) corresponding to the single tapped displayed item here is a function to be performed in response to an execution instruction for the function assigned to the single-tapped displayed item. Examples of the function include a function for displaying a sublayer item of the operated item, a function for changing the display based on the operated item to a position different from the display position of the operated item, and a function for changing the setting for the digital camera 100 indicated by the operated item.

In S406, the system control unit 50 moves the cursor to select a single tapped display item. In this case, the function corresponding to the single-tapped display item is not executed.

In S407, the system control unit 50 determines whether execution of the touch-up detected in S317 is within the third threshold time from the first touch-down (S301). If execution of the touch-up is within the third threshold time, the process proceeds to S408, and if not, the process proceeds to S403 (as it is determined that there has been a single tap). The third threshold time will be described with reference to FIG. 7.

In S408, the system control unit 50 determines whether the first threshold time has elapsed from the touch-up detected by S317. If the first threshold time has elapsed (if it is determined that there has been a single tap rather than a single double tap), the process proceeds to S403, and if not, the process proceeds to S409.

In S409, the system control unit 50 determines whether there has been a touch-down on the touch panel 70a again in a first location. If there has been a first touch-down again (i.e., if there has been a touch-down again within the first threshold time from the previous touch-down), the third threshold time starts to be measured and the process proceeds to S410. Otherwise, the process proceeds to S408 and stands by for the first threshold time to elapse or for another touch-down.

In S410, the system control unit 50 determines whether a touch-up from the touch panel 70a has occurred. If a touch-up has occurred, the process proceeds to S411, and if not, the process proceeds to S413.

In S411, the system control unit 50 determines whether the occurrence of the touch-up detected in S410 is within the third threshold time from the touch-down detected in S409. If the touch-up occurrence is within the third threshold time (if it is determined that there has been a single-double tap), the process proceeds to S412, and if not (if it is determined that there has been a single-tap rather than a single double tap), the process proceeds to S403.

In S412, the system control unit 50 performs a function (processing) corresponding to a single double tap. The function corresponding to the single double tap will be described for example with reference to FIGS. 6A to 6C.

In S413, the system control unit 50 determines whether there has been a touch-move by a single touch. If there has been a touch-move, the process proceeds to S321 in FIG. 3, and if not, the process proceeds to S414.

In S414, the system control unit 50 determines whether there has been a touch-down in a second location on the touch panel 70a. If a touch-down has been detected in another location without releasing the first touch-down caused by the touch-down detected in S409, the result of determination is Yes, and the process proceeds to S306 in FIG. 3. If there has been no second touch-down (if the single touch state continues), the process proceeds to S410 and repeats the processing.

Figure 5A:
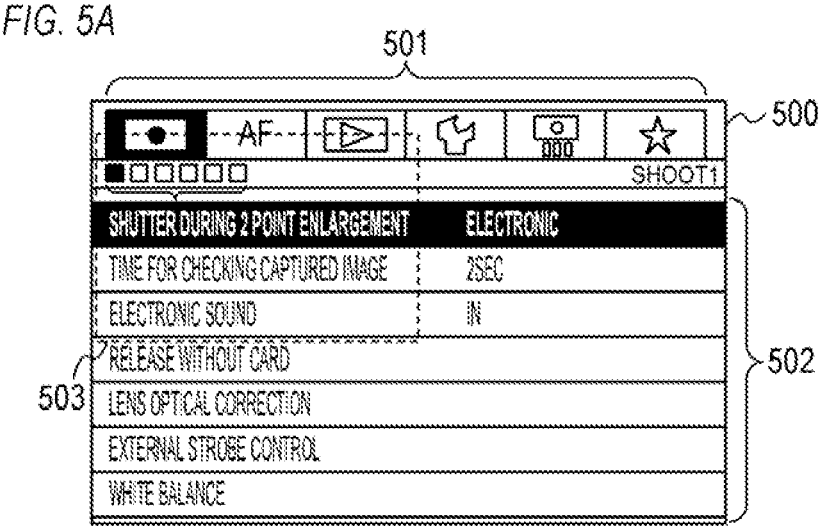
FIGS. 5A to 5C illustrate example screens.
Figure 5B:
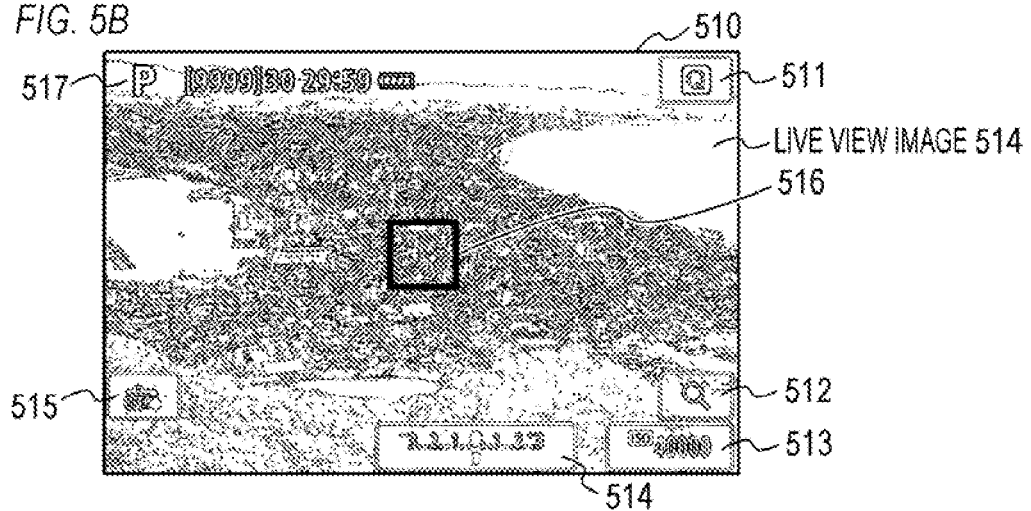
Figure 5C:
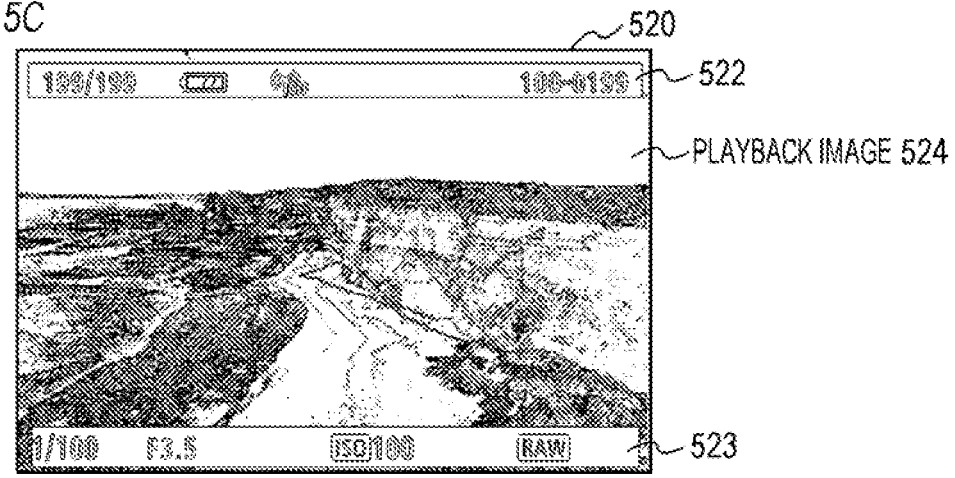

FIGS. 5A to 5C illustrate example screens displayed at the display unit 28. FIGS. 5A and 5B show screens which do not detect a single double tap, and FIG. 5C shows a screen which detects a single double tap.

The screen 500 in FIG. 5A is a menu screen for performing various settings including setting items related to the digital camera 100 (also serving as an information display screen (setting display screen) indicating the set states of various items (setting details)). The screen 500 includes a tab group 501 (multiple tabs) and a setting item group 502 (multiple setting items belonging to the selected tab). The multiple tabs and multiple setting items are each a display item and are arranged on the screen 500 with no gaps. When a single tap is performed on a tab, the multiple setting items are switched to multiple setting items corresponding to the single-tapped tab by the processing in S405 in FIG. 4. When a single tap is performed for a setting item, the screen displayed at the display unit 28 is moved from the screen 500 to the next screen corresponding to the single-tapped setting item (transition to a lower layer screen) by the processing in S405. The next screen is, for example, a setting screen for setting various parameters. The setting screen will be described with reference to FIGS. 8A to 8D.

The screen 510 in FIG. 5B is an imaging screen displaying a live view image 514 and includes touch items (touch-operable display items indicating setting items for imaging) 511 to 515 and an AF frame 516. When a single tap is performed on any of the touch items 511 to 515, the single-tapped touch item is selected by the processing in S405 and the function (processing) corresponding to the selected touch item is performed. For example, when a single tap is performed on the touch item 513, the ISO sensitivity setting screen is displayed, and the user can set an ISO sensitivity selected among the ISO sensitivity setting candidates displayed on the ISO sensitivity setting screen. The AF frame 516 can be moved to an arbitrary position by touching the live view image 514 displayed on the screen 510. When a single tap is performed on the AF frame 516, imaging (photo-shooting operation) is performed by the processing in S405. The imaging screen 510 also includes a display item 517 which indicates the imaging mode, but the display item 517 is not a touch item and the corresponding function is not activated by touching the display item 517.

The screen 520 in FIG. 5C is a playback screen which displays a playback image 524 (the captured image is played back) recorded on the recording medium 200 and includes display items 522 and 523 which indicate the states of the digital camera 100 and information about the displayed playback image. The display items 522 and 523 are not touch items, and the corresponding functions are not activated by touching the display items 522 and 523.

In the screens 500 and 510 in FIGS. 5A and 5B, there are many touch items and the total area of touch items (the percentage of touch items on the screen) is large. More specifically, the area in which the functions are activated by a single tap is large, and the user is likely to perform a single tap. When a single tap is detected (with high accuracy), execution of the single-tapped function is delayed by the time to stand by for the determination in S408. Therefore, the screens 500 and 510 in FIGS. 5A and 5B are screens configured not to detect a single double tap. This eliminates the standby time after a single tap and improves the convenience because the single tap function can be performed with higher response.

Also, a single tap function is activated if a single double tap is likely to be performed on a touch item and the next touch-down is not performed within the first threshold time (NO in S411). For this reason, the screens 500 and 510 in FIGS. 5A and 5B are screens configured not to detect a single double tap. This reduces erroneous operation (unintended single taps) and allows the user to operate comfortably.

Meanwhile, the screen 520 in FIG. 5C has a few (or nonexistent) touch items and the total area of the touch items is small (or zero). More specifically, the area in which a function is activated by a single tap is small (or nonexistent) and the user is less likely to perform a single tap. In such a screen, the importance of performing a single tap function with high response may be relatively low. Therefore, the screen 520 in FIG. 5C is a screen for detecting a single double tap. Although there are no touch items in the screen 520 in FIG. 5C, a screen having only a few touch items or a screen with a small total area of touch items may be used as a screen for detecting a single double tap. If the screen has an area which allows the user to comfortably perform a single double tap (a large area with no touch items), it may be used as a screen for detecting a single double tap.

As described above, according to the embodiment, a screen having a large total area of touch items (more than a threshold) or a screen having a small number of touch items (less than a threshold) is set as a screen configured not to detect a single double tap, and the other screens are set as screens for detecting a single double tap. If it takes time to set imaging parameters when imaging, photo opportunities may be missed. Therefore, a screen including touch items for performing functions related to setting for imaging parameters by a single tap may be used as a screen which does not detect a single double tap. Screens configured to detect and not to detect a single double tap may be separated in consideration of some (at least one) of the total area of touch items, the number of touch items, and the type of touch items (functions corresponding to touch items), or all of the above may be taken into consideration.

Figure 6A:
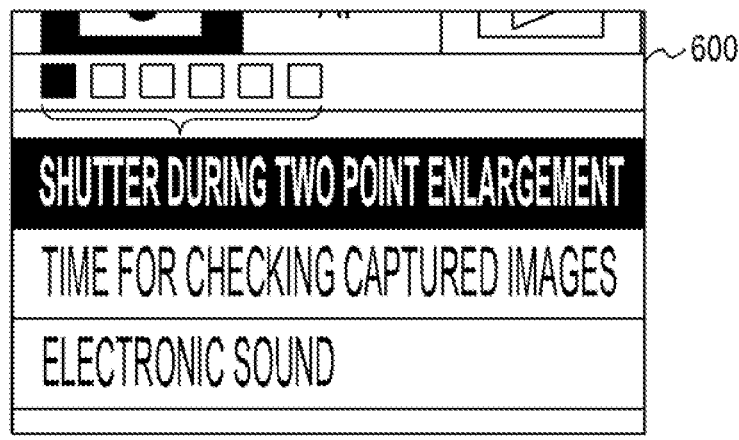
FIGS. 6A to 6C illustrate example screens.
Figure 6B:
Figure 6C:
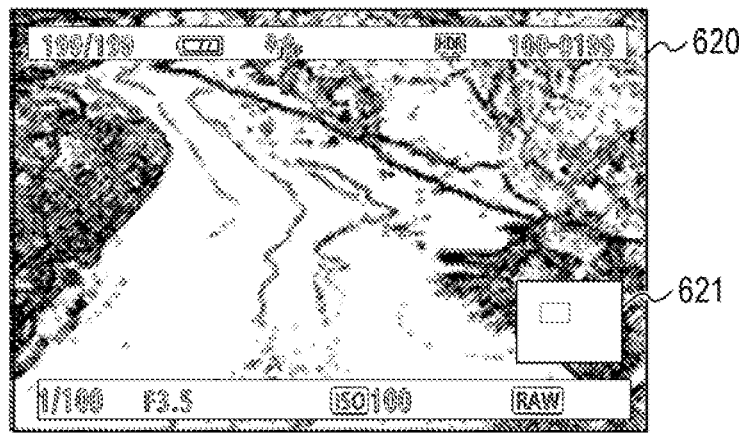

FIGS. 6A to 6C illustrate example screens displayed at the display unit 28. FIG. 6A shows a menu screen, FIG. 6B shows an imaging screen, and FIG. 6C shows a playback screen.

The menu screen 600 in FIG. 6A is an enlarged screen of the area 503 in FIG. 5A. When a multi-double tap is performed on the menu screen 500 in FIG. 5A, the menu screen 500 is enlarged by the processing in S312 in FIG. 3, and enlarged display is performed as shown in FIG. 6A.

The imaging screen 610 in FIG. 6B is an enlarged screen of the live view image 514 in FIG. 5B. When a multiple double tap is performed on the imaging screen 510 in FIG. 5B, the live view image 514 is enlarged by the processing in S312, and an enlarged display is performed as shown in FIG. 6B. The imaging screen 610 includes an indicator 611 representing an enlarged position of the live view image 514.

The playback screen 620 in FIG. 6C is an enlarged screen of the playback image in FIG. 5C. When a single double tap is performed on the playback screen 520 in FIG. 5C, the playback image 524 is enlarged by the processing in S412 in FIG. 4, and an enlarged display (change in the display magnification) is performed as shown in FIG. 6C. The playback screen 620 includes an indicator 621 indicating an enlarged position in the playback image 524.

Since a single double tap is not detected on the menu screen or imaging screen, the enlargement processing (enlarged display, change in the display magnification) is performed by a multi-double tap. Meanwhile, since it is assumed that a single double tap is detected on the playback screen, the enlargement processing (change in the display magnification) is performed by the single double tap. In both of the screens, the enlargement processing can be performed using a double tap (a single double tap or a multi-double tap) as operation widely recognized and familiar to the public.

The processing (function) which starts by a double tap (a single double tap or multi-double tap) does not have to be enlargement. For example, reducing processing for reducing a screen or image may be activated in response to a double tap. More specifically, the screen may be returned to the menu screen 500 by a multi-double tap on the menu screen 600, or the screen may be returned to the imaging screen 510 by a multi-double tap on the imaging screen 610. The screen may be returned to the playback screen 520 by a single double tap on the playback screen 620. In response to a double tap, the screen may be shifted from the imaging screen 510 or the playback screen 520 to the menu screen 500, or the screen may be returned to the original screen before transition to the menu screen 500 in response to a double tap (a multi-double tap) after transition to the menu screen 500. A single double tap on the playback screen 520 may be used to perform processing for adding a predetermined attribute to a playback image (captured image) such as protecting processing. An image may be played back or shot in response to a double tap. More specifically, any function which can be performed by the digital camera 100 may be performed in response to a double tap.

In addition, in the playback screen 520 (which detects a single double tap), a multi-double tap may be disabled or both single and multi-double taps may be enabled (both are effective in the flowcharts in FIGS. 3 and 4). In this case, the functions which start in response to a single double tap and the functions which start in response to a multi-double tap may be the same or different. In the flowcharts shown in FIGS. 3 and 4, functions are not performed in response to a multiple tap, but the functions may be performed in response to a multiple tap.

FIG. 7 is a timing chart for illustrating the first threshold time, the second threshold time, and the third threshold time. The solid line 701 shows change over time in the state of the first finger (touch-on (touch) on the touch panel 70a or touch-off (non-touch) from the touch panel 70a), and the solid line 702 shows change over time in the state of the second finger. The solid lines 701 and 702 indicate change over time when a multi-double tap is performed. Note that although the operation member is a finger in the described example, the operation member does not have to be a finger and may be a pen.

As shown in FIG. 7, a target in comparison with the first threshold time is the time from the touch-up of the finger to the touch-down of the finger in a double tap (a single double tap or a multi-double tap). Generally, in a double tap, the time from the touch-up of the finger to the touch-down of the finger is about 200 msec to 500 msec. Therefore, time of about 200 msec to 500 msec may be set as the first threshold time. When the first threshold time is reduced, the standby time for a single tap to be activated is reduced, but this makes it difficult for the user to double-tap.

A target in comparison with the second threshold time is the time from the touch-down of the first finger to the touch-down of the second finger in a multi-touch. Generally, in a multi-touch, the two fingers touch the touch panel 70a almost simultaneously, so that time shorter than the first threshold time, for example about 50 msec, may be set as the second threshold time.

A target in comparison with the third threshold time is the time from the touch-down to the next touch-up in a tap (a single tap or a double tap). If the touch-on continues for too long time, the third threshold time is preferably not too long because it is unlikely that the user desires to double-tap. For example, similarly to the first threshold time, time of about 200 msec to 500 msec may be set as the third threshold time.

When it is determined whether touch operation is a single tap or a single double tap, activation of the single tap function is delayed because the first threshold time has to elapse. Meanwhile, the standby time for determining whether touch operation is a single tap or a multi-double tap is the second threshold time, and the second threshold time is shorter than the first threshold time. Therefore, if a multi-double tap is detected without detecting a single double tap, the stress upon the user waiting for the single tap function to be activated is reduced.

According to the embodiment, the threshold time between the first and second single taps for determining a single double tap and the threshold time between the first and second multiple taps for determining a multi-double tap are set to be the same first threshold time. However, if each tap performed continuously in a short time of time may be determined, the threshold times may be different. More specifically, the threshold time (first time) between the first and second single taps to determine a single double tap and the threshold time (predetermined time) between the first and second multi-taps to determine a multi-double tap may be different thresholds.

FIGS. 8A to 8D illustrate an example white balance setting screen in which "cursor movement only" can be performed by a single tap as a screen displayed on the display unit 28. The screen is displayed when execution of a white balance setting item is instructed while the white balance setting item (display item) is selected from the setting item group 502 displayed on the menu screen 500 in FIG. 5A. More specifically, when the cursor points the white balance setting item, the screen is displayed by the processing in S405 in response to a single tap on the white balance setting item. The white balance setting screen in FIGS. 8A to 8D includes a plurality of touch items corresponding to a plurality of white balance parameters and the cursor for selecting a parameter touch item. The cursor may be displayed from the beginning to indicate any of the set parameter touch items, or may be displayed in response to a single tap on the parameter touch item.

Figure 8A:
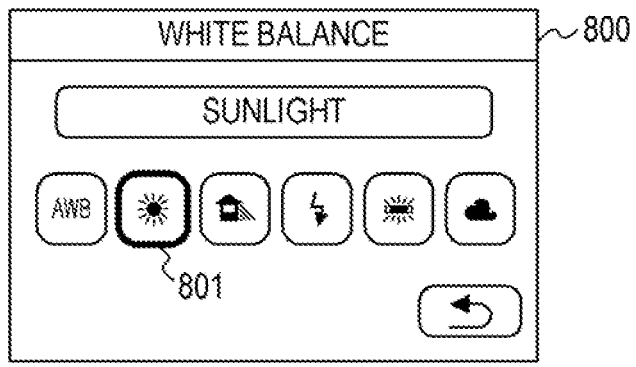
FIGS. 8A to 8D illustrate example screens.
Figure 8B:
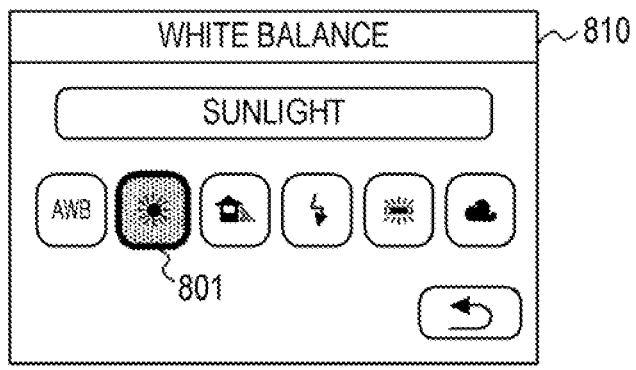

In the white balance setting screen 800 in FIG. 8A, "sun light" is selected as a parameter touch item with the cursor 801. When a single tap is performed to the parameter touch item "sun light," the parameter "sun light" is set by the processing in S405 in FIG. 4. More specifically, the screen changes to the white balance setting screen 810 in FIG. 8B in response to a touch-down, and the parameter "sunlight" is set in response to a touch-up (single tap). Then, the white balance setting screen 810 is closed (the white balance setting screen is no longer displayed, for example, as the screen returns to the screen immediately before the white balance setting screen is displayed). In the white balance setting screen 810, the display (such as color) of the corresponding touch item is changed so that the touch on the parameter "sunlight" can be recognized.

Figure 8C:
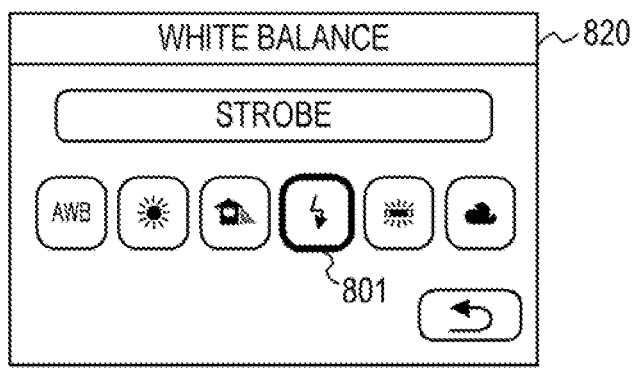
Figure 8D:
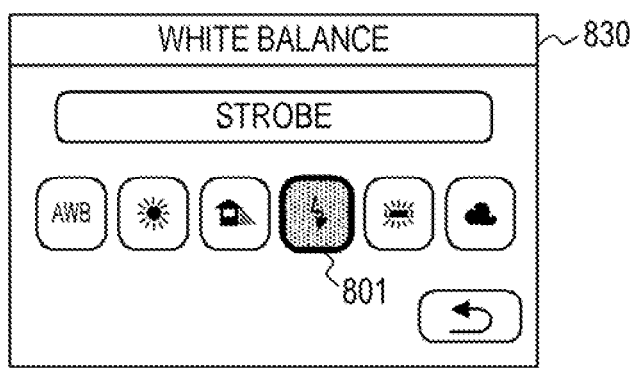

When a single tap is performed on a parameter touch item "strobe" while the white balance setting screen 800 is displayed, the screen changes to the white balance setting screen 820 in FIG. 8C by the processing in S406 in FIG. 4. More specifically, the cursor 801 moves to indicate the touch item of the parameter "strobe." When the single tap for the touch item of the parameter "flash" is repeated, the parameter "strobe" is set by the processing in S405 in FIG. 4. More specifically, the screen changes to the white balance setting screen 830 in FIG. 8D in response to the touch-down, the parameter "strobe" is set in response to the touch-up (single tap), and the white balance setting screen 830 is closed.

In this way, in order to set the parameter "strobe" from the state in which the white balance setting screen 800 is displayed, at least two single taps are required, and the user who wishes to set the parameter quickly performs two single taps quickly. Therefore, it is preferable not to detect a single double tap on a screen such as the white balance setting screen (i.e., an operation system that does not use a single double tap) so that two single taps are not erroneously detected as a single double tap, and this is the case according to the embodiment. For example, in the menu screen 500 in FIG. 5A, an unselected touch item may be selected by a single touch thereon, and a function corresponding to the selected touch item may be activated by a single touch on the selected touch item.

Here, when there are both the screen in which the function is activated by a single-double tap and the screen in which the function is activated by a multi-double tap rather than a single-double tap, the user may hesitate to decide which double-tap will activate the function. Therefore, when the screen displayed at the display unit 28 changes from one of these two screens to the other, a predetermined guidance may be displayed (for example, a guide display for a type of operation which is enabled on the screen after the transition).

Figure 9:
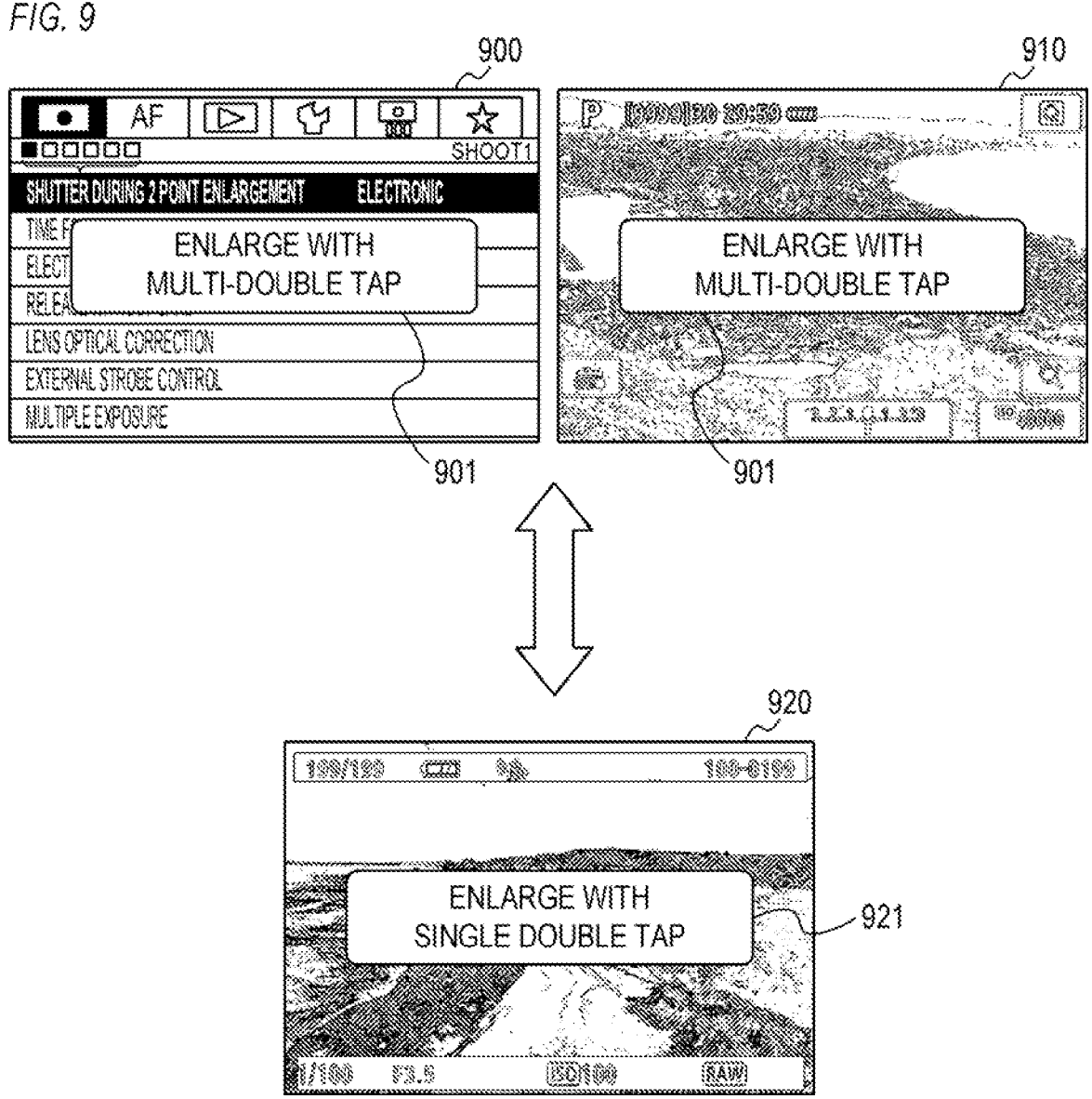
FIG. 9 illustrates an example guidance display.

FIG. 9 shows an example guidance display. Screens 900 and 910 are screens in which a function is activated by a multi-double tap without activating a function using a single double tap (screens configured not to detect a single-double tap). The screen 900 is a menu screen, and the screen 910 is an imaging screen. The screen 920 is a screen in which a function is activated by a single double tap (a screen configured to detect a single-double tap), and is a playback screen. When the screen changes from the playback screen 920 to the menu screen 900 or the imaging screen 910, a guidance 901 indicating that the function is activated by a multi-double tap is displayed. When the screen changes from the menu screen 900 or the imaging screen 910 to the playback screen 920, a guidance 921 indicating that the function is activated by a single double tap is displayed. The user can easily grasp a double tap (a single double tap or a multi-double tap) which is activated on the current screen by looking at the guidance 901 and the guidance 921.

As in the foregoing, according to the embodiment, it is possible to achieve both operational feeling resulting from high response which allows a function corresponding to a single tap to be carried out quickly and convenience which allows many functions to be used separately in response to touch operation.

While the present invention has been described in detail according to the preferred embodiments, the present invention is not limited by the specific embodiments and various modifications without departing from the spirit and gist of the present invention fall within the scope of the present invention. Furthermore, each of the embodiments described above is merely one embodiment of the invention and the embodiments may be combined as appropriate.

In addition, the various types of control performed by the system control unit 50 in the above description may be performed by one hardware component or the entire device may be controlled by a plurality of hardware components (for example, a plurality of processors or circuits) which share processing. In the description of the embodiment, the present invention is applied to a digital camera (imaging device), but the invention is not limited by this example and may be applied to any touch-sensitive electronic device. The invention may be applied to a device having a touch-sensitive display as well as a touch-sensitive touch pad as a discrete device from the display such as a notebook PC. For example, the present invention may be applied to a personal computer, a PDA, a mobile phone terminal, a portable image viewer, a printer device, a digital photo frame, a music player, a game machine, an electronic book reader, and a video player. The present invention may also be applied to a display device (including a projector), a tablet terminal, a smartphone, an AI speaker, a home appliance, an on-board device, and a medical device.

According to the present disclosure, it is possible to achieve both operational feeling resulting from high response which allows a function corresponding to a single tap to be carried out quickly and convenience which allows many functions to be used separately in response to touch operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-135985, filed on Jul. 24, 2019, which is hereby incorporated by reference herein in its entirety.

What is claimed is:

1. An electronic device comprising:
at least one memory and at least one processor which function as:
a determination unit configured to determine a touch operation on an operation surface; and
a control unit configured to control so that
in a case where a first screen is displayed on a display,
a first function is executed in response to a first type of operation in which the operation surface is touched at one location and the operation surface is touched again at one location within a first time from the touch at the previous location, and
in a case where a second screen is displayed on the display,
a second function is executed in response to a second type of operation in which the operation surface is touched at one location, without waiting for the first time to elapse from the touch at the location, and
a third function is executed in response to a third type of operation in which the operation surface is touched at two locations and the operation surface is touched again at two locations within a predetermined time from the touch at the previous two locations,
wherein the operation surface is a display surface of the display,
wherein the second function is a function corresponding to a display item displayed by the display and touched by the second type of operation, and
wherein
(i) a number of display items operable by the second type of operation of the second screen is more than a number of display items operable by the first type of operation of the first screen, or
(ii) a display item operable by the second type of operation is displayed in the second screen, but a display item operable by the second type of operation is not displayed in the first screen.

2. The electronic device according to claim 1, wherein the second screen is a screen of which a total area of display items operable by the second type of operation is greater than a total area of display items operable by the first type of operation of the first screen.

3. The electronic device according to claim 1, wherein the first screen is a playback screen for displaying a playback image.

4. The electronic device according to claim 3, wherein the first function is enlargement of the playback image.

5. The electronic device according to claim 1, wherein the first function and the third function are enlargement display functions.

6. The electronic device according to claim 1, wherein the second screen is a setting menu screen for selecting a setting item related to the electronic device or a setting display screen for indicating a set content for the setting item.

7. The electronic device according to claim 6, wherein the second function is a function of selecting a setting item touched by the second type of operation.

8. The electronic device according to claim 6, wherein the third function includes a function of executing enlargement display of the second screen.

9. The electronic device according to claim 1, wherein the second screen is a screen for displaying a live view image captured by an image sensor.

10. The electronic device according to claim 9, wherein the second function is a function of selecting a display item indicating a setting item related to imaging by the image sensor and touched by the second type of operation.

11. The electronic device according to claim 9, wherein the third function includes a function of executing enlargement display of the live view image.

12. The electronic device according to claim 1, wherein the first type of operation is a double tap by a single touch, the second type of operation is a single tap by a single touch, and the third type of operation is a double tap by a multi-touch.

13. The electronic device according to claim 1, wherein each of the first type of operation, the second type of operation, and the third type of operation is an operation in which a touch position is not moved while being touched.

14. The electronic device according to claim 1, wherein in a case where the second screen is displayed on the display, even if the first type of operation is performed, the control unit does not execute a function corresponding to the operation.

15. The electronic device according to claim 1, wherein the first time and the predetermined time are equal.

16. The electronic device according to claim 1, wherein the third function is a function not based on a display item displayed in a touch position by the third type of operation.

17. The electronic device according to claim 1, wherein the third function includes at least one of a function of returning to a previous screen, a function of turning off display, a function of changing display brightness, a function of switching information to be displayed, a function of changing setting for a specific set item, a function of calling up a setting menu screen, a function of switching to a specific screen, and a function of transition to a state for inputting a search key.

18. The electronic device according to claim 1, wherein the control unit controls so that in a case where the first screen is displayed on the display, the second function is executed in response to the second type of operation being performed, after the first time elapses from release of touch by the second type of operation.

19. The electronic device according to claim 1, wherein the control unit further controls so that in a case where a screen displayed by the display transitions from one of the first screen and the second screen to the other, guide display related to a type of operation to be validated on the screen after the transition between the first type of operation and the third type of operation is executed.

20. The electronic device according to claim 1, wherein the electronic device is an imaging device including an image sensor.

21. A control method of an electronic device, comprising:
determining a touch operation on an operation surface; and
controlling so that
in a case where a first screen is displayed on a display,
a first function is executed in response to a first type of operation in which the operation surface is touched at one location and the operation surface is touched again at one location within a first time from the touch at the previous location, and
in a case where a second screen is displayed on the display,
a second function is executed in response to a second type of operation in which the operation surface is touched at one location, without waiting for the first time to elapse from the touch at the location, and
a third function is executed in response to a third type of operation in which the operation surface is touched at two locations and the operation surface is touched again at two locations within a predetermined time from the touch at the previous two locations,
wherein the operation surface is a display surface of the display,
wherein the second function is a function corresponding to a display item displayed by the display and touched by the second type of operation, and
wherein
(i) a number of display items operable by the second type of operation of the second screen is more than a number of display items operable by the first type of operation of the first screen, or
(ii) a display item operable by the second type of operation is displayed in the second screen, but a display item operable by the second type of operation is not displayed in the first screen.

22. A non-transitory computer readable medium that stores a program, wherein the program causes a computer to execute a control method of an electronic device, the control method comprising:
determining a touch operation on an operation surface; and
controlling so that
in a case where a first screen is displayed on a display unit,
a first function is executed in response to a first type of operation in which the operation surface is touched at one location and the operation surface is touched again at one location within a first time from the touch at the previous location, and
in a case where a second screen is displayed on the display unit,
a second function is executed in response to a second type of operation in which the operation surface is touched at one location, without waiting for the first time to elapse from the touch at the location, and
a third function is executed in response to a third type of operation in which the operation surface is touched at two locations and the operation surface is touched again at two locations within a predetermined time from the touch at the previous two locations, wherein the operation surface is a display surface of the display, wherein the second function is a function corresponding to a display item displayed by the display and touched by the second type of operation, and wherein
- (i) a number of display items operable by the second type of operation of the second screen is more than a number of display items operable by the first type of operation of the first screen, or
- (iii) a display item operable by the second type of operation is displayed in the second screen, but a display item operable by the second type of operation is not displayed in the first screen.

\* \* \* \* \*